(12) United States Patent
Mühlbacher et al.

(10) Patent No.: US 11,274,913 B2
(45) Date of Patent: Mar. 15, 2022

(54) ALIGNING COMPONENTS IN RELATION TO A COORDINATE MEASURING MACHINE

(71) Applicant: Carl Zeiss Industrielle Messtechnik GmbH, Oberkochen (DE)

(72) Inventors: Jochen Mühlbacher, Heidenheim (DE); Kurt Brenner, Satteldorf (DE); Dominic Bulling, Eschach (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/845,115

(22) Filed: Apr. 10, 2020

(65) Prior Publication Data

US 2020/0333125 A1 Oct. 22, 2020

(30) Foreign Application Priority Data

Apr. 10, 2019 (DE) .................... 10 2019 205 145.6

(51) Int. Cl.
*G01B 11/00* (2006.01)
*G01B 5/012* (2006.01)
*G01B 5/00* (2006.01)

(52) U.S. Cl.
CPC ........... *G01B 5/012* (2013.01); *G01B 5/0004* (2013.01); *G01B 11/007* (2013.01)

(58) Field of Classification Search
CPC .... G01B 11/007; G01B 21/047; G01B 5/012; G01B 5/0004; G01B 21/24
USPC .......................................... 356/614–626.369
See application file for complete search history.

(56) References Cited

U.S. PATENT DOCUMENTS

| 5,040,306 A * | 8/1991 | McMurtry | G01B 7/008 33/556 |
| 2004/0118000 A1* | 6/2004 | Roth | G01B 11/007 33/556 |
| 2013/0167389 A1* | 7/2013 | Christoph | G01B 5/0014 33/503 |
| 2013/0304250 A1* | 11/2013 | McMurtry | G01B 5/012 700/195 |
| 2014/0215841 A1* | 8/2014 | Danbury | G01B 5/008 33/503 |
| 2014/0236520 A1* | 8/2014 | Engel | G01D 5/24452 702/95 |
| 2015/0131697 A1* | 5/2015 | Sakai | G01B 5/008 374/56 |

(Continued)

FOREIGN PATENT DOCUMENTS

| DE | 10 2013 208 397 A1 | 11/2014 |
| DE | 10 2015 211 950 A1 | 12/2016 |
| EP | 1 279 918 A2 | 1/2003 |

(Continued)

*Primary Examiner* — Isiaka O Akanbi
(74) *Attorney, Agent, or Firm* — Miller Johnson

(57) ABSTRACT

A stylus is arranged on a coordinate measuring machine. A method for aligning a component in relation to the coordinate measuring machine includes positioning the stylus and the component in relation to one another according to a defined arrangement. The method includes acquiring at least one coordinate of the component. The method includes changing at least one of a position and an orientation of the component in relation to the coordinate measuring machine while maintaining the defined arrangement.

17 Claims, 10 Drawing Sheets

(56) References Cited

U.S. PATENT DOCUMENTS

2017/0138718 A1*  5/2017  Ruck .................... G01B 5/0014
2018/0245905 A1*  8/2018  Brenner ................. B82Y 15/00

FOREIGN PATENT DOCUMENTS

EP         2 050 534 A1    4/2009
WO    WO-2015/014398 A1    2/2015

* cited by examiner

ALIGNING COMPONENTS IN RELATION TO A COORDINATE MEASURING MACHINE

CROSS-REFERENCE TO RELATED APPLICATIONS

This application claims priority to German Application No. 10 2019 205 145.6 filed Apr. 10, 2019. The entire disclosure of the application referenced above is incorporated by reference.

FIELD

The invention relates to coordinate measuring machines and more particularly to aligning components in relation to a coordinate measuring machine.

BACKGROUND

Coordinate measuring machines serve in a known way for measuring objects such as for example industrially produced workpieces. This may in particular involve determining coordinate values of locations of an object (known as scanning points) and combining them for example in the form of a 3D point cloud. On the basis of these measured values it is possible to deduce for example the dimensions, the three-dimensional shape and/or the maintaining of pre-determined desired properties of the object (for example admissible deviations of shape).

In order to acquire coordinate values, the object may be scanned for example in a tactile or contactless (for example optical) manner. For this purpose, a tactile or contactless sensor device (for example a measuring sensor with a tactile stylus attached to it) is positioned and moved by the coordinate measuring machine in relation to the object. The positioning takes place by means of machine kinematics, which comprise multiple machine axes that are movable by means of a respective drive device. For acquiring the coordinate values, the axial positions (i.e. axial values) of the individual machine axes that are adopted can be acquired and/or evaluated.

Unless otherwise stated or evident, the invention is directed both to optical styli and tactile styli. Individual embodiments may however be restricted to the use of tactile styli.

It is also known that, for measuring objects (i.e. for acquiring their coordinates) by a coordinate measuring machine, additional components may be arranged in the working space of the coordinate measuring machine. These may be for example so-called counterholders, which are used for fixing long workpieces in particular, and are used in particular for measuring applications with a rotary table. Examples and background information on such counterholders can be found in the applicant's WO 2015/014398 A1.

To be more precise, for measuring long cylindrical workpieces, the latter are often placed on a rotary table and during the measurement are rotated about the axis of rotation of the rotary table, with the sensor device, for example a tactile sensor device, generally stationary. Typical workpieces are crankshafts, camshafts and gearwheels. These workpieces are best measured in an upright position, in order to eliminate the possibility of them bending under their own weight. For measuring, the workpieces are clamped onto a precision rotary table and rotated, in order to be able to acquire all of the test features. In this case, the workpieces may be clamped on the rotary table at the lower end, for example by means of a tip (cone tip) and a three-jaw chuck. Counterholders are used in the case of such measuring in order to fix the workpiece at the opposite upper end and keep it in position. An upper centering tip (cone tip) in the counterholder can be adjusted in height along a displacement axis, in order to be able to clamp workpieces of different lengths. In order to obtain great measuring accuracy, it is preferred that the centering tip of the counterholder is always located exactly over the centering tip of the rotary table, irrespective of the vertical position of the centering tip. Both centering tips lie for example on the Z axis of the coordinate system of the CMM. This alignment of the counterholder is carried out during the installation or fitting of the counterholder in the CMM.

As described, certain components must therefore be adjusted or positionally adjusted in relation to a coordinate measuring machine (CMM), which can generally be understood as meaning a relative alignment of the position and/or orientation of the component in relation to the coordinate measuring machine. To put it another way, in the course of an adjustment, the spatial position (or attitude) of an object in relation to the CMM may be changed, the position comprising the location and orientation of the object in space. This may generally be with reference to a coordinate system of the CMM, of which at least some axes may preferably run parallel to the axes of motion or machine axes of the CMM.

Previously, the component has preferably been measured by the CMM itself in order to determine a current position and/or orientation of the component in relation to the CMM (i.e. to determine this information for example in CMM coordinates). If an adequate match is not established, the position and/or orientation of the component is changed. This generally takes place manually and by estimating a required extent of the change of position and/or orientation. After this intervention, the component is measured once again and it is determined whether a desired (intended) position and/or (intended) orientation has been achieved. This therefore provides an iterative procedure with multiple manual interventions and a respective subsequent measurement. This requires experience and is time-consuming.

In the mentioned WO 2015/014398 A1, according to some exemplary embodiments additional sensors are provided, in order to obtain positional information for components of a counterholder. Using such additional sensors may however be undesired for reasons of expenditure or cost.

SUMMARY

It is an object of the present invention to simplify the alignment of components in relation to a coordinate measuring machine.

This object is achieved by the subjects of the appended independent patent claims. Advantageous developments are specified in the dependent claims. It goes without saying that, unless otherwise stated or evident, all of the initially mentioned features and explanations can also be provided in the case of the present solution or apply to it.

The basic concept of the invention is to acquire positional information also during a positional change of the component in relation to the coordinate measuring machine (i.e. preferably to acquire it in real time), and consequently to provide an operator with feedback on the extent to which a currently performed positional change is meaningful or leads to a desired target state. This differs from the previously chosen iterative procedure, in which an operator had to carry out a complete measuring operation after each positional change and only subsequently obtained information concerning the appropriateness of a positional change performed.

Instead, according to the invention, positional information for feedback can also be obtained during or preferably directly after ending a positional change of the component in relation to the CMM. This preferably also takes place without carrying out a complete measuring operation, but instead for example by maintaining probing of the component by a stylus of the CMM also during a positional change of the component in relation to the CMM.

It is therefore possible to obtain as it were on-line positional information and/or positional information in real time and preferably also to inform an operator directly, for example by means of a display device. On the basis of this current positional information, the operator can learn directly to what extent a positional change performed is helpful in achieving a desired target state (i.e. intended state). For example, a distance or a deviation from a corresponding target state may be presented to the operator by means of the display device. This may for example relate to a two-dimensional position of the component in a horizontal plane of the CMM.

In detail, the invention proposes a method for aligning (or in other words adjusting and/or arranging) components in relation to a coordinate measuring machine, wherein a stylus is arranged on the coordinate measuring machine, and wherein the method comprises:
a) positioning the stylus and the component in relation to one another according to a defined arrangement (in particular by probing the component with the stylus and adopting the defined arrangement);
b) acquiring at least one coordinate of the component;
c) changing (or in other words adjusting) a position and/or an orientation (i.e. the spatial position or attitude) of the component in relation to the coordinate measuring machine while maintaining the defined arrangement (of the stylus and the component in relation to one another).

The component may be a counterholder, and in particular individual components of the counterholder, such as for example a cone tip that is displaceable and aligned in the direction of a rotary table. It may similarly be a holder, and in particular a holder mounted on a rotary table (for example comprising a cone tip), which may interact with a counterholder for clamping a workpiece. Any desired clamping device, a tool or generally a workpiece may however also be provided as the component.

The coordinate measuring machine may be formed according to the conventional type of design, for example as a coordinate measuring machine with three axes of motion aligned orthogonally in relation to one another and/or as a coordinate measuring machine of a gantry type of construction.

The stylus is preferably mounted compliantly on the coordinate measuring machine. This may take place by it being movable independently of movements of the coordinate measuring machine, to be precise preferably in all spatial directions (i.e. along and around all spatial axes). In other words, the compliant mounting may provide freedom of movement of the stylus, even whenever the axes of motion of the coordinate measuring machine are stationary. This may be relevant in particular for tactile styli, which can change their position within the freedom of movement available as a result of the compliant mounting in accordance with counter forces or contact forces occurring in the course of the tactile probing.

The adoption (or in other words setting) of a defined arrangement of the stylus and the component may take place without manual interventions, for example just on the basis of the relative movement of the stylus and the component in the course of the probing. In particular, this defined alignment may be set automatically by bringing the stylus and the component into contact, and the forces thereby acting. This may also be described as centering in the course of the probing, and in particular as self-centering of the stylus and the component in relation to one another.

The self-centering may comprise that no additional forces and/or movements apart from the probing movement and contact forces thereby occurring have to be provided in order to achieve the desired defined arrangement. As described below, such self-centering (or generally the adoption of the defined alignment) may take place for example as a result of specially shaped portions in the region of contact or engagement of the stylus and the component. These may for example force the stylus into a preferred (centered) position in relation to the component, for example by producing slipping or sliding movements of the stylus in a predetermined direction if it does not yet have the desired arrangement.

In the case of an optical stylus, the defined arrangement may be a defined distance, which can be determined by way of measuring signals of the stylus and/or be maintained by way of readjusting movements of the stylus as a consequence of positional changes of the component.

The defined alignment may comprise that at least part of the stylus and at least part of the component are aligned in relation to one another in a specific way. For example, a probing ball of the stylus may engage at a predetermined contact position or in a predetermined region of contact or engagement of the component (also referred to hereinafter as the centering region). Similarly, this may comprise that, in a predetermined region (for example centering region) of the component, the stylus lies against the component, or takes up at least a portion of it within itself, which applies for example to a ring stylus explained below. Also in these states, the stylus may preferably adopt a predetermined alignment in relation to the component (for example with reference to a longitudinal axis of the component and in particular orthogonally thereto).

The at least one coordinate that is determined may be acquired for at least one point of the component. It may be a virtual point of the component, such as for example a geometrical center point thereof, which cannot be probed in reality since it lies in the interior of the volume of the component. In other words, the acquisition of the coordinate may also comprise a computational acquisition, preferably however based on information obtained by means of the probing (for example surface coordinates).

The changing of the position and/or orientation of the component may take place manually. Maintaining the defined arrangement may comprise that, in the case of tactile probing, contact between the stylus and the component is maintained, to be precise for example in the same region of contact (for example centering region) and/or with a relative arrangement of one to the other that is the same. In the course of optical probing, for example the same distance between the component and the stylus may be maintained (for example by automatically adapting a stylus position by moving the CMM axes). Such automatic adaptation of the stylus position may also be provided in the case of tactile probing. For example, whenever the freedom of movement of a stylus compliantly mounted on the measuring sensor is no longer adequate and/or has been used up, the CMM may be displaced correspondingly, in order to restore at least partially the freedom of movement.

Generally, for maintaining the defined arrangement, a force may also be applied by the coordinate measuring machine to the stylus, in order to hold it on the component and/or press it against it. This force is preferably of such a magnitude that a freedom of movement of the compliant mounting is not completely used up or at least partially remains.

One advantage of this variant is that, as a result of the defined arrangement of the stylus and the component, and in particular maintaining this arrangement even after changing the position and/or orientation (i.e. spatial position) of the component, coordinate information of the component can be determined without probing once again, or generally carrying out a complete measuring operation.

To put it another way, after setting the defined arrangement in step a), and for example with knowledge of the dimensions of the stylus, it can be assumed that measurement information for a specific region or point of the component can be obtained, for example for a centering region of the component or a region of the component (for example geometrical center point) that is positioned in a known way in relation to the centering region. It can therefore be assumed that, when the defined arrangement is achieved, a conversion rule for converting the coordinates determined by the CMM to the coordinates actually of interest of a specific region of the component is valid.

The fact that the defined arrangement of the stylus and the component is however also retained during a positional change of the component in step c) means that this conversion rule also continues to be valid during or after this positional change. On the basis of the measurement information (in particular coordinate information) determined by the coordinate measuring machine, it is therefore possible in spite of positional changes of the component to determine directly changed coordinate information of the same point and/or region of the component that was measured in step a) or step b). This means that current coordinate information can be obtained in real time, or existing coordinate information can be continuously updated in real time, without a potentially error-affected and time-consuming separate measuring operation having to be carried out on the component after each positional change. The continuously determinable and/or updated information can also be presented to an operator in real time, for example in order to give him feedback on whether a desired intended relative position of the component and the CMM has been achieved or whether or not a current positional change (for example displacement) of the component brings it closer to the desired intended state.

According to a development, it is provided that at least one coordinate of the component can be acquired or is acquired (preferably continuously and/or a number of times) after and/or during step c). Therefore, renewed acquisition at least one more time of at least one coordinate of the component may take place after and/or during step c). This may be the same coordinate that was previously acquired in step b), or a different coordinate. Similarly, the method may comprise the step that, after carrying out step b), a deviation from an intended state, and in particular an intended position of the component in relation to the coordinate measuring machine, is determined. This can preferably be displayed to an operator.

After (or during) carrying out step c) at least once, the changed position of the component may also be displayed and/or a changed deviation in relation to the intended position. If coordinates of the component are acquired during the change according to step c), this may be displayed to an operator directly (i.e. in real time). The same applies to determined deviations from an intended position, which can likewise be continuously updated and/or displayed. Already during, but preferably at least directly following, changing of the relative position of the component and the CMM, the operator can consequently obtain information concerning whether a desired target state has then been achieved.

A development provides that the stylus is arranged compliantly on the coordinate measuring machine, wherein the compliant mounting is preferably provided by way of a measuring sensor of the coordinate measuring machine. Measuring sensors of CMMs may also be referred to as a probe or probing system. The applicant sells such measuring sensors under the name VAST. In a way known per se, they serve the purpose of acquiring movements of a (tactile) stylus, as occur as a result of probing a component and for example in accordance with counter forces thereby produced, and performing a determination of coordinates on this basis. For this, the measuring sensors provide freedoms of movement, which may for example comprise a few millimeters (for example at least two or at least four millimeters) in each spatial direction and also preferably around each spatial axis. An example of a measuring sensor with corresponding freedoms of movement (referred to there as a probe) can be found in EP 1 279 918 A2.

The method may be provided in particular when using such a measuring sensor for fine adjustment, wherein a relative position of the component and the coordinate measuring machine is adapted to a slight extent (for example with freedoms of movement given by the measuring sensor). The coarse adjustment, by contrast, may take place for example by the known iterative approaches or generally by eye. A general advantage is that any component alignment according to the invention may take place without or with at least limited additional hardware expenditure, for example since hardware components that are already present on the coordinate measuring machine in the form of the measuring sensor can be used. For certain embodiments, however, it is advantageous if specially formed styli are used for carrying out the method and/or centering regions explained below are provided on the stylus or the component. Hardware adaptations with respect to a customary measuring operation may consequently be required, and even preferred, for implementing the solution according to the invention in the case of certain embodiments.

As already mentioned, it may generally be provided that the axes of the coordinate measuring machine are (for example at least initially or at least temporarily) stationary during step c) or are moved in accordance with the change of the position and/or orientation of the component (for example follow this change and/or move along with the components, for example while maintaining as described herein or compensating for a compression of a compliant mounting). In this case, the freedom of movement for the positional change in step c) is preferably provided by way of the compliant mounting. The component is then preferably moved actively in relation to the stationary CMM (for example by manual displacement). If a measuring sensor is used for the compliant mounting, this may continuously deliver measurement signals, from which the changing coordinate information can be determined, for example in real time. This may make faster and more reliable determination of the relative alignment of the component and the CMM possible in comparison with moving CMM axes.

According to a further exemplary embodiment, at least one out of the stylus and the component comprises a centering region and, in step a), the defined arrangement (of the stylus and the component) is obtained by bringing the stylus and the component into engagement in the centering region. For example, the centering region may be a specially shaped region, which may comprise recesses, sloping surfaces, projections or generally free-standing portions of the component.

By the engagement in the central region, the stylus and the component can as it were be forced into and/or kept in the defined arrangement in relation to one another, for example since a centering region of the component at least partially receives the stylus or else a centering region of the stylus at least partially receives the component. To put it another way, generally a form fit that defines or gives the defined arrangement may consequently be produced between the centering region and the other respectively out of the stylus and the component.

During the change of the relative position in step c), this form fit, and consequently also the defined arrangement of the stylus and the component, can be maintained. This represents a reliable possibility for maintaining the defined arrangement in spite of the change of the relative position of the component and the CMM, and makes possible in general the self-centering explained above in the course of the operation of probing the component. For example, the stylus may as it were slip into a centering region of the component (or vice versa) and then also be held in the centering region, so that the contact portion of the stylus (for example a probing element such as a probing ball) is defined and constantly aligned in relation to the component. A defined relative arrangement may be understood here as meaning in general a predetermined relative arrangement.

According to one variant, the centering region is formed on the component. In this case, the centering region may for example comprise a recess, for example a notch or generally a recess provided with at least one edge or at least one sloping surface (for example a wedge-shaped recess or groove). The recess may for example comprise at least two surfaces angled toward one another and preferably three or four surfaces angled toward one another (for example of a pyramid-shaped form). Similarly possible is a conical depression, for example for centering a spherical probing element. The probing element may also comprise a bore or some other kind of recess (for example with at least three inner bearing surfaces) and interact with a projection of the component, in particular with a spherical portion of the component. During the probing operation, a spherical stylus or a spherical probing element of the stylus (a probing ball) for example may engage in this recess, and in particular slip into it and thereby adopt the defined relative arrangement.

Alternatively, the centering region may be formed on the component as a free-standing portion of the component (for example as a projection or a cone tip). This free-standing portion of the component may then be received for example in a corresponding portion (for example a ring-shaped portion) of the stylus in order to adopt the predetermined relative arrangement. The engagement may be achieved for example by the stylus being pushed onto this free-standing portion of the component, for example until a predetermined counter force is achieved. The pressing-on movement of the stylus may take place along a longitudinal axis of the component (for example a longitudinal axis of the cone if the portion of the component is formed as a cone tip). In particular by means of the preferred compliant mounting, the stylus can however also move transversely in relation to this axis, in order to accomplish the self-centering described above. The free-standing portion of the component may also comprise a frustum of a cone, a ball tip (cone with an inserted ball on or in place of its cone tip), at least one hemisphere element and/or at least one cylinder element or be formed as such.

According to one variant of the invention, the stylus has a receiving portion, for example a (closed or open) ring-shaped portion, which in step a) receives at least a portion of the component and thereby preferably achieves the defined arrangement of the stylus and the component. The received portion of the component may be for example the free-standing portion of the component explained above, or generally a centering region. A receiving portion comprising such a stylus may also be referred to as a ring stylus As mentioned, the ring-shaped portion may define an open or completely closed ring, in which the component can be received. However, the ring-shaped portion is preferably closed over at least 200° and/or open over no more than 120°.

Within the receiving portion, preferably spherical elements (contact balls) may be positioned, in order to avoid instances of canting of the receiving portion and the component and/or in order to set defined contact points between the receiving portion and the component (typically one contact point per ball). These may in principle be mounted rotatably, but to achieve great positioning accuracy they are preferably received in the receiving portion in a stationary manner. To put it another way, the receiving portion (and in particular a ring-shaped portion) may therefore comprise a plurality of contact balls, for example at least three, which are preferably positioned at equal angular intervals from one another (that is to say spaced apart from one another by 120° in the case of three contact balls).

For receiving the portion of the component, which may be in particular the aforementioned cone tip, the receiving portion (and in particular a ring-shaped portion) of the stylus may be moved toward the portion of the component. The receiving portion is in this case preferably aligned substantially orthogonally in relation to a direction of movement. This movement may take place until a predetermined counter force against the direction of movement is registered (for example by means of the aforementioned measuring sensor of the CMM). This counter force may indicate that the receiving portion has completely received the portion of the component or has been pushed onto it by a maximum distance or to a maximum extent. The compliant mounting and/or the optional contact balls mentioned make it possible in this case however for instances of canting of the stylus on the component to be avoided. Subsequently, coordinate information of the component may be acquired.

Orthogonal alignment of an axis in relation to the receiving portion, and in particular the optional ring-shaped portion, may generally be understood as meaning that a spatial plane in which a (closed or open) circumferential line defined by the receiving portion lies runs orthogonally in relation to this axis. The same applies to angles in general of the receiving portion in relation to an axis, which may likewise be measured between this plane and the axis. This plane may also contain a geometrical center point of the receiving portion, for example a center point of an opening defined or surrounded by the receiving portion. In general, the receiving portion may comprise or define a circular opening, or at least partially surround such an opening (for example in the case of an open ring portion).

As already indicated above, a variant according to the invention provides aligning the component in relation to an axis of the coordinate measuring machine, wherein (or so that), after carrying out step c) at least once, an angle between the receiving portion and the axis changes, and in particular increases. In particular, the receiving portion may subsequently be arranged substantially orthogonally in relation to the axis. The angle is preferably the (smaller) angle of intersection between the receiving portion and the axis. This can be determined according to known vector-based formulae. The axis may be an axis of rotation of a rotary table or a workpiece axis. However, alignments are also possible in relation to any desired points and axes in the measuring volume.

An axis of the coordinate measuring machine may be herein generally any axis defined in the coordinate system of the CMM and also the coordinate axes of this coordinate system itself. In particular, it may be a virtual axis, which however may also coincide with axes of motion of the CMM or run parallel thereto. Axes of motion of the CMM may generally be defined by machine axes by which the stylus is movable in space. Here they may however also be axes by which for example a workpiece is movable in relation to the CMM, for example the axis of rotation of a rotary table that is positioned in the working space of the CMM.

Consequently, in the case of the variants mentioned above, it may be envisaged to align the component in relation to a rotary table axis (axis of rotation) of the CMM, about which a workpiece is rotatable in relation to a stylus of the CMM, by means of which however the stylus itself is preferably not movable. For example, after receiving the portion of the component in the receiving portion and setting the defined relative arrangement of the stylus and the component, it may be determined how the receiving portion (for example a plane of an opening comprised by it) lies in relation to a corresponding axis of rotation, and then the component together with the receiving portion arranged on it may be tilted in relation to the axis of rotation until there is an orthogonal alignment of the receiving portion in relation to the axis or coordinate axis.

It may be preferred here that the defined arrangement in step a) is performed in such a way that the receiving portion lies orthogonally in relation to a longitudinal axis of the component, and in particular in relation to a longitudinal axis of the cone if the component is the cone tip of a counterholder and/or holder on a rotary table.

A further variant provides that the stylus has a shank with a probing element arranged on it (for example a probing ball), which is brought into contact with the component in step a). This stylus may be provided as an alternative or in addition to a receiving portion. For example, the stylus may be a combined ring- and shank-shaped stylus, with for example a probing ball. For this, the shank with the probing ball may be arranged on an outer side of the ring-shaped portion. Such a combined stylus may be used for performing various adjustment operations, for example an adjustment of the position of the component with reference to various (coordinate) axes, wherein one of the styli (shank with probing element or ring stylus) can then be selected according to the current adjustment task. In particular, this stylus may be used for absolute coordinate measurements. By contrast, a stylus with a receiving portion may be used for coordinate measurements in relation to or with reference to further axes, and in particular an axis of rotation, as explained in still more detail below.

According to one variant, the stylus with the probing element engages in a centering region explained above of the component, in particular in a wedge- or pyramid-shaped recess, which forms the centering region, and in this way the defined arrangement of the stylus component is achieved.

A stylus with a shank and a probing element may be used for example whenever the component is to be arranged within a spatial plane (in particular a horizontal or X-Y plane in the system of coordinates of preferably the CMM) in relation to the coordinate measuring machine and a coordinate of the component in this spatial plane is determined with the stylus.

As mentioned, the component may be in general the component of a workpiece holding device, such as for example of a holder positioned on a rotary table or a counterholder, wherein the workpiece can be clamped between the holder and the counterholder. Preferably, the holder is connected to the rotary table for rotation therewith and the counterholder is displaceable along an axis in relation to the rotary table. Furthermore, the counterholder may be mounted rotatably about the axis of rotation of the rotary table. Both the holder and the counterholder preferably comprise cone tips. A position of these cone tips can be determined by means of the solutions according to the invention.

For example, the component may be a component part of a counterholder arrangement with a displacement axis and also a (workpiece) counterholder that is displaceable along this displacement axis (for example a cone tip), wherein the displacement axis is aligned parallel to an axis (coordinate axis) of the coordinate measuring machine by carrying out step c) at least once. This axis may be the axis of rotation of a rotary table of the CMM or an axis coinciding with this axis of rotation.

The counterholder may be formed according to any of the variants described herein. The displacement axis may be a linear axis. An inclination of the displacement axis may be adapted in a way known per se by way of adjusting screws, which may lead to a tilting of the displacement axis in relation to a plane of the CMM, and in particular a horizontal plane thereof.

The counterholder and the displacement axis may be aligned in a defined manner in relation to one another, so that an alignment of the displacement axis can also be deduced from an alignment of the counterholder (and vice versa). Correspondingly, the counterholder may be probed as a component (in particular by a ring-shaped proportion of the stylus according to one of the above variants) and also an alignment of the counterholder may be changed in step c), which however may be accompanied by an analogous change of the alignment of the displacement axis. For example, an alignment of the longitudinal axis of the counterholder (in particular a longitudinal axis of a cone) and the displacement axis may be performed in such a way that they run parallel to one another and this alignment is preferably constant or is not changed during the method (i.e. a positional change of the longitudinal axis of the counterholder can be converted into a corresponding positional change of the displacement axis, or is accompanied by it, and vice versa).

It may be provided that a coordinate of the counterholder is determined at at least two positions along the displacement axis. These positions are preferably maximum positions at the end and at the beginning of the displacement axis (i.e. an uppermost and lowermost position along the displacement axis). The at least one coordinate is also preferably a position along the axis (coordinate axis) of the coordinate measuring machine, in relation to which the displacement axis is to be aligned. This is preferably a vertical coordinate axis or Z axis. This may be aligned parallel to a direction in which a gravitational force acts.

Furthermore, it may be provided that an item of information on the alignment of the displacement axis in relation to the axis (coordinate axis) of the CMM is determined, wherein this is determined in particular on the basis of the coordinates that were determined in the at least two positions along the displacement axis.

In addition or as an alternative, it may be provided that the component is a component part of a counterholder arrangement with a displacement axis and a counterholder that is displaceable along the displacement axis, and, by carrying out step c) at least once, a position of the component in a plane running non-parallel and for example orthogonally to the displacement axis is made to coincide with an intended position in this plane. This is preferably performed after the displacement axis has been aligned in the way explained above in relation to an axis (coordinate axis) of the CMM, wherein this axis advantageously runs orthogonally in relation to the aforementioned plane.

For this purpose, probing may be performed with a shank-shaped stylus together with a probing element attached to it. This is based on the concept that, as a result of possible skewing of the ring stylus in relation to the spatial plane, measurements with a ring stylus may have an undesired positional offset or error in this plane. This may lead to an offset of the ring stylus or a center point thereof in relation to the spatial plane, as still to be explained below on the basis of the figures. By contrast, using the shank-shaped stylus with a probing element allows greater absolute accuracy to be achieved.

The invention also relates to an arrangement with:
a coordinate measuring machine;
a stylus arranged on the coordinate measuring machine; and
a component to be aligned in relation to the coordinate measuring machine,
wherein the component and the stylus can be arranged in a defined manner in relation to one another and a position and/or an orientation of the component in relation to the coordinate measuring machine can be changed while maintaining the defined arrangement of the stylus and the component.

Maintaining the defined arrangement in spite of the positional change of the component can be achieved in general by force control in which the stylus is kept in contact with the component (through the CMM axes) with a specific force. This may be done by relying on the signals of an aforementioned measuring sensor. For optical styli, the possibility of maintaining a distance by readjusting movements of the stylus was explained above.

In particular, the arrangement may be designed to carry out a method according to all of the embodiments mentioned below and above. For example, the stylus may be formed according to any of the variants above and below. The same also applies to the component to be probed.

Any explanations, developments or variants that are explained in connection with the method may also apply to the equivalent features of the arrangement. In general, the arrangement may provide all of the functioning modes, interactions or steps provided herein that are explained in connection with the method according to the invention.

According to one variant, the arrangement comprises a control device which is designed to carry out a method according to any of the variants explained herein. In particular, the control device may be designed to carry out steps a) to c) of the method according to the invention as well as any other optional steps and measures. Accordingly, the invention similarly relates to an arrangement with:
a coordinate measuring machine;
a stylus arranged on the coordinate measuring machine;
a component to be arranged in relation to the coordinate measuring machine; and
a control device, which is designed to carry out at least the aforementioned steps a) to c). As an alternative or in addition, the control device may be designed to activate the coordinate measuring machine in such a way that these steps are provided. For step a), in general probing in a centering region described herein, while monitoring counter forces occurring, may be specified or initiated by the control device. For step c), the defined arrangement may be maintained by a force control carried out or initiated by the control device.

The invention also relates to a stylus for a coordinate measuring machine, in particular a tactile stylus, which has a receiving portion (for example a ring-shaped portion), in which a portion of a probed component can be at least partially received. For example, the receiving portion, and in particular any (completely closed or at least partially open) ring-shaped portion thereof, may lie at least in certain regions and in particular at multiple points against an outer circumferential surface of the component. In general, this stylus or the receiving portion thereof may be formed according to any of the variants described herein.

According to a further embodiment, the stylus also has a shank (for example a cylindrical and/or straight shank) with a probing element (in particular a probing ball) arranged on it, which can be brought into contact with the component. This shank or this probing element may once again be formed according to any of the variants explained herein.

Finally, the invention also relates to the use of a stylus according to one of the previous aspects for measuring a position and/or an orientation of a component of a workpiece holding arrangement in relation to a coordinate measuring machine. In particular if a combined ring- and shank-shaped stylus is used, such a component can be advantageously aligned in relation to the coordinate measuring machine without changing the stylus. As explained below on the basis of the figures, this relates in particular to an alignment of cone-shaped workpiece holders, such as for example cone-shaped holders and/or counterholders, which can interact for clamping a workpiece in a workpiece holding arrangement.

DETAILED DESCRIPTION

Figure 1:
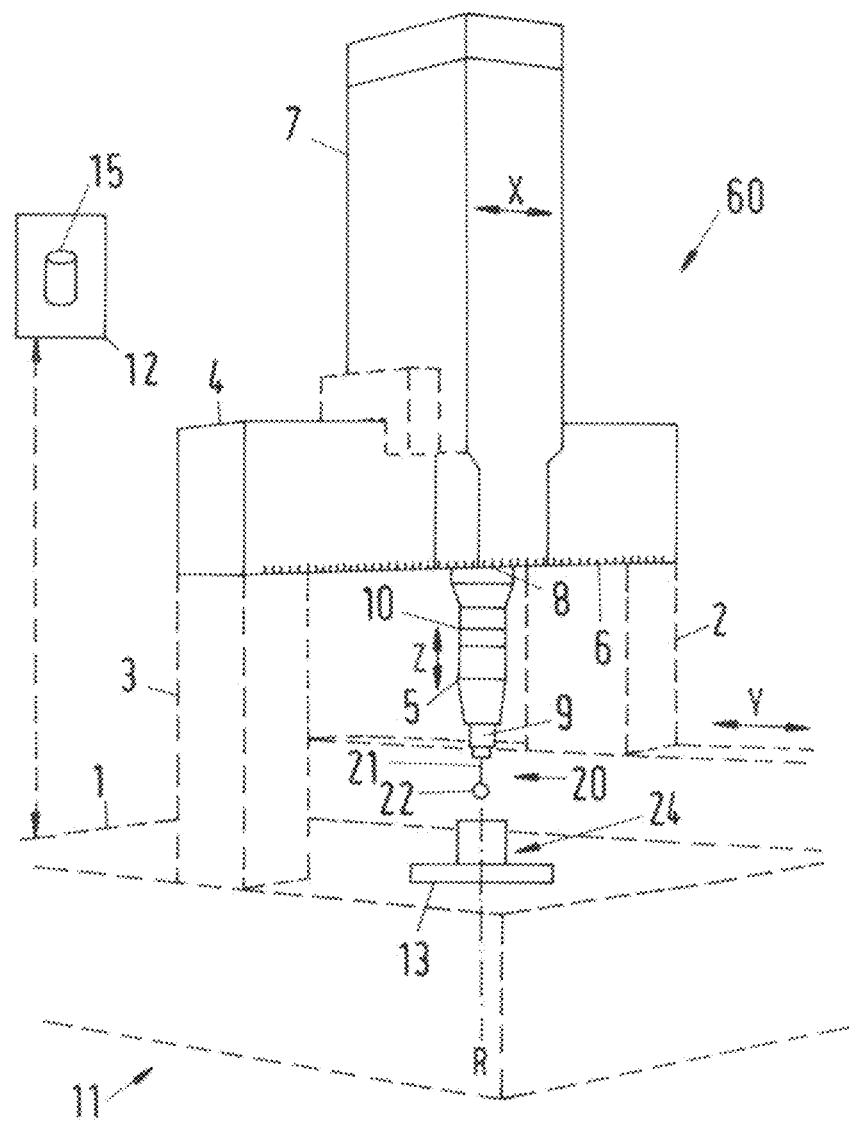
FIG. 1 shows a perspective representation of an arrangement according to the invention that carries out a method according to the invention.

Shown in FIG. 1 is a coordinate measuring machine (CMM) 11, which is comprised by an arrangement 60 according to an exemplary embodiment of the invention and which carries out a method according to the invention. The arrangement 60 also comprises a stylus 9 and component 24 to be probed and aligned (see FIG. 2), which are explained in still more detail on the basis of the further figures.

The CMM 11 serves in general for acquiring coordinate values of locations or positions on the surface of the component 24 in the form of a workpiece, for example in order to check on that basis so-called test features (for example a deviation in shape, a roundness or a parallelism). In a way known per se, the CMM 11 is formed in a gantry type of construction and comprises a measuring table 1, over which columns 2, 3 can be displaced in the Z direction. Together with a crossbeam 6, the columns 2, 3 form a gantry of the CMM 11. To be more precise, the crossbeam 6 is connected at its opposite ends to the columns 2 and 3, respectively, which are mounted longitudinally displaceably on the measuring table 1.

The crossbeam 6 is combined with a cross slide 7, which is movable, by way of air bearings, along the crossbeam 6 (in the X direction). The momentary position of the cross slide 7 in relation to the crossbeam 6 can be established on the basis of a scale graduation 8.

A quill 10, which is movable in the vertical direction (i.e. in the Z direction), is mounted on the cross slide 7 and is connected at its lower end to a probe (or measuring sensor) 5 for tactile probing. Removably arranged on the probe 5 is a stylus 9. The stylus 9 is a stylus 20 with a shank-shaped portion 21 (also called a shank 21) and a probing ball 22 arranged on it as a probing element. As explained on the basis of FIG. 2, the stylus 20 may also be combined with a ring stylus.

Arranged on the measuring table 1 is an additional rotatable rotary table 13, arranged on which is the component 24, which can be rotated by turning the rotary table 13 about a vertical axis of rotation R (which runs parallel to the Z axis of the CMM 11 and to the direction of effect of the gravitational force). The axis of rotation R may form a machine axis of the CMM 11, since it is preferably activatable by means of the following control device 12.

Correspondingly, FIG. 1 schematically shows a control device 12 of the CMM 11, which may be realized for example by a computer (for example with a microprocessor), which has software and at least one data memory 15. The control device 12 is connected by way of signal and control lines to activatable components of the CMM 11, in particular to drive devices of the axes thereof. Furthermore, the control device 12 is connected by way of a measurement data link to those elements of the CMM 11 that are used for determining measured values determined when measuring a measurement object or component (for example with the probe 5).

Figure 2:
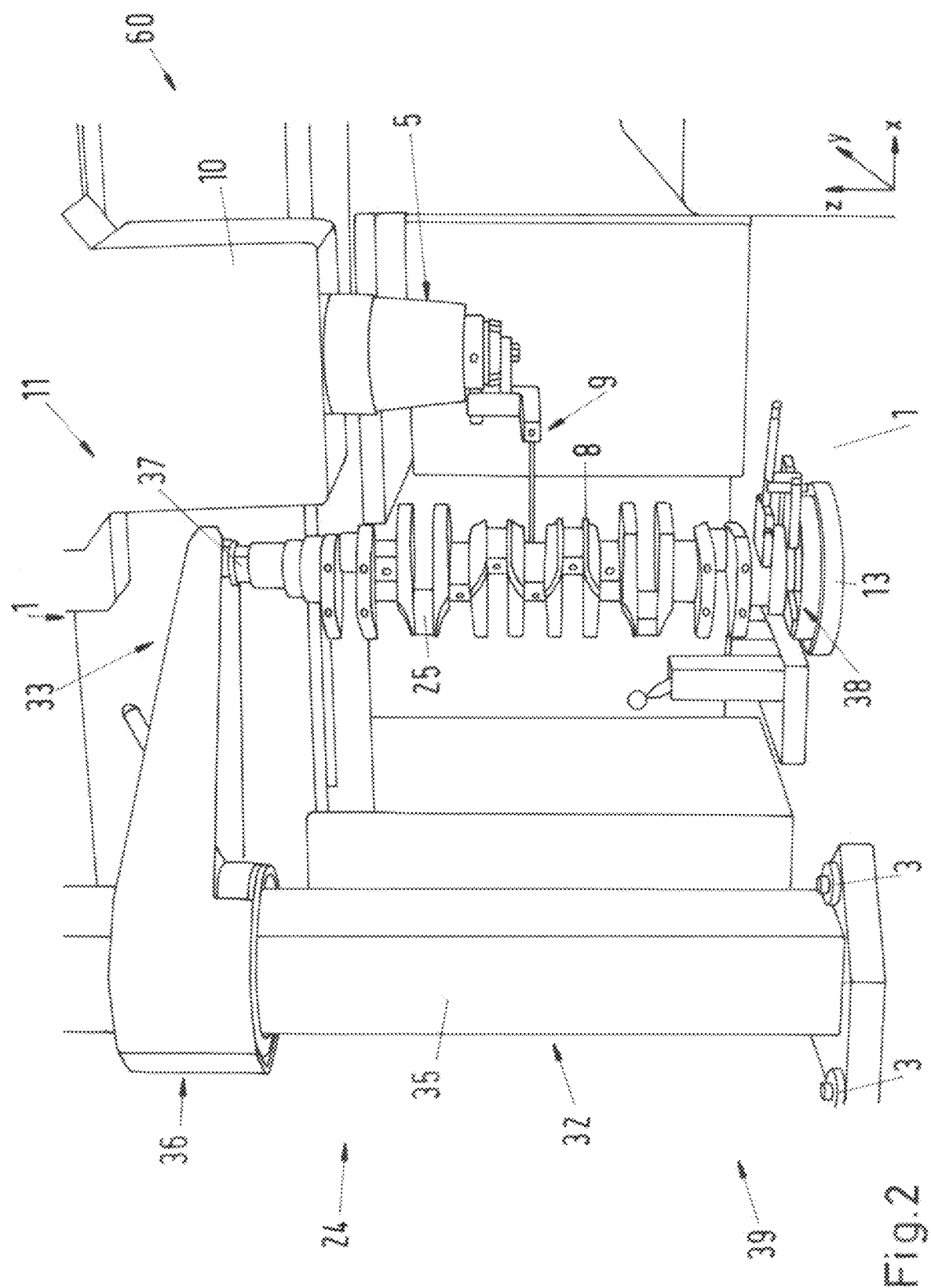
FIG. 2 is a detailed depiction of the arrangement from FIG. 1, with however a different representation of individual features and also with an additional counterholder arrangement in the working space.

FIG. 2 shows a depiction of a detail of the CMM 11 from FIG. 1, with however a partly different representation of the individual features and in a perspective turned about the Z axis. In addition, in this representation a counterholder arrangement 32 in which a workpiece 25 is clamped (as a difference from FIG. 1 a camshaft) is furthermore arranged in the working space of the CMM 11. The counterholder arrangement 32 corresponds to a conventional type of design and is fastened by fastening means 3 on a surface of the CMM 11, here on a surface of the measuring table 1. The counterholder arrangement 32 forms together with a cone tip 38 explained below a workpiece holder of a workpiece holding arrangement 39 that is mounted on the rotary table 13.

A component 24 in the sense of the patent claims may be, in the example shown, a component of the workpiece holding arrangement 39 or else any (sub)component comprised by it. In particular, this may concern components of the counterholder arrangement 32 or else the lower cone tip 38.

The counterholder arrangement 32 has an elongate displacement axis 35 (linear axis), which projects upward from the surface of the measuring table 1 in the Z direction (see coordinate system in FIG. 2, wherein the X-Y axes define a horizontal spatial plane and the axes thereof are respectively aligned analogously to the axes of motion with the same designations of the CMM from FIG. 1).

Attached on the displacement axis 35 is an arm 36 with a cone tip 37 that is rotatable in relation to the arm 36 (for the most part concealed). The cone tip 37 is facing the surface of the measuring table and forms the actual counterholder 33 of the counterholder arrangement 32. Located opposite is the rotary table 13, with a cone tip 38 facing the arm 36 or the cone tip 37 thereof (concealed). The latter is connected to the rotary table 13 for rotation therewith.

A rotational movement of the rotary table 13 may be transmitted by way of the lower cone tip 38 to the workpiece 25 and be supported or borne by the upper cone tip 37. By way of a displacement of the arm 36, a clamping or holding force can be exerted on the workpiece 25, in order that it does not slip during rotation. This corresponds to a conventional configuration and conventional operation of workpiece holding arrangements 39, as also explained in WO 2015/014398 A1 mentioned at the beginning.

A general aim with the arrangement 60 from FIG. 2 is to adjust (i.e. preferably align) the position of the components of the workpiece holding arrangements 39 and in particular in relation to the rotary table 13 already adjusted (i.e. preferably aligned) in the coordinate system of the CMM. On account of the already set and fixed relative alignment of the rotary table 13 and the CMM 11, an alignment of the counterholder arrangement 32 in relation to the rotary table 13 consequently also corresponds to an arrangement or alignment of the counterholder arrangement 32 in relation to the CMM 11.

In a way known per se, the adjustment of the counter-holder arrangement 32 is intended in this case to be performed in such a way that the displacement axis 35 is aligned parallel to the axis 38 of the rotary table, wherein the latter is aligned in a way corresponding to the Z axis of the CMM 11 or perpendicularly to the surface of the measuring table 1. As a result, the arm 36, including its cone tip 37, can be displaced in height (Z direction), without the position of the cone tip 37 in the XY plane and in relation to the rotary table 13 changing. Examples of how such an alignment can be reliably and efficiently achieved by means of the solutions according to the invention are explained below.

Figure 3:
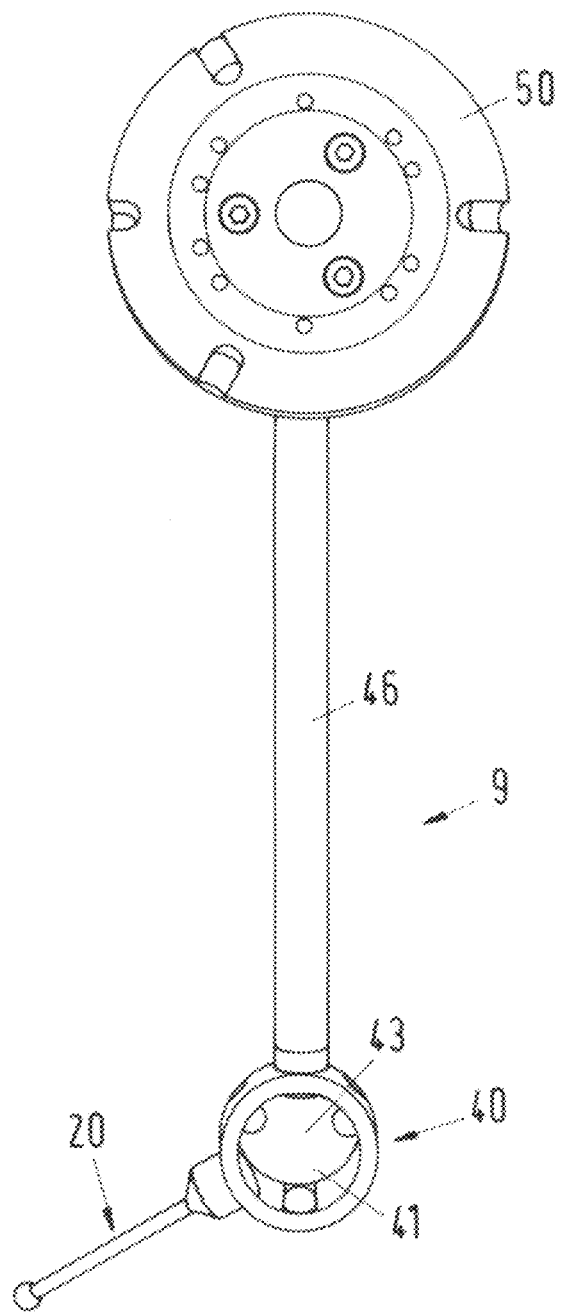
FIG. 3 shows a stylus according to the invention, which is made up of a stylus with a shaft-shaped portion and a ring stylus and can be used in the case of the arrangements of FIG. 1 and FIG. 2.

Shown in FIG. 3 is a stylus 9 and the stylus interface 50 thereof (stylus plate) for connecting to the probe 5 from FIG. 2, wherein the probe 5 may be formed for example as a conventional sensor of the applicant's type series VAST. The stylus 9 differs from the stylus 9 of FIG. 1 and FIG. 2, but can be used in the case of the solutions shown there and represents a preferred variant of a stylus 9 according to the invention.

The stylus 9 comprises two stylus components, which, each taken for itself and independently of one another, can perform probing of a workpiece and also, each taken for itself, can be used as a stylus in the sense of the invention.

The first of these that is evident is the stylus 20 already explained on the basis of FIG. 1. A further stylus component takes the form of a ring stylus 40 or probing ring, which forms a receiving portion 43 of the stylus 9. The ring stylus 40 has an opening 41, which in the case shown is circular. The ring stylus 40 surrounds the opening 41 completely or, in other words, has a closed ring profile. Arranged on an inner side of the ring stylus 40 are three contact balls 42, which are positioned at angular intervals of 120° in relation to one another and fix or define radially at the furthest inner-lying points within the opening 41 an inner circumference of the opening 41. As also explained below, when inserting a component portion into the opening 41, a contact of points on the surface of the component is built up in relation to the contact balls 42, and preferably only in relation to these contact balls 42 (i.e. not in relation to other points on an inner circumferential surface of the ring stylus 40).

The ring stylus 40 is shown in FIG. 4 once again in a representation of a single part, wherein the opening 41 and also the contact balls 42 distributed on its inner side can once again be seen. The ring stylus 40 is connected by way of the screw 44 to a rigid shank portion 46 that can be seen in FIG. 3, and in this way also to the measuring sensor 5, so that movements of the ring stylus 40 or forces applied to it can be transmitted to the measuring sensor 5 and can be sensed by the latter in a way known per se.

Figure 4:
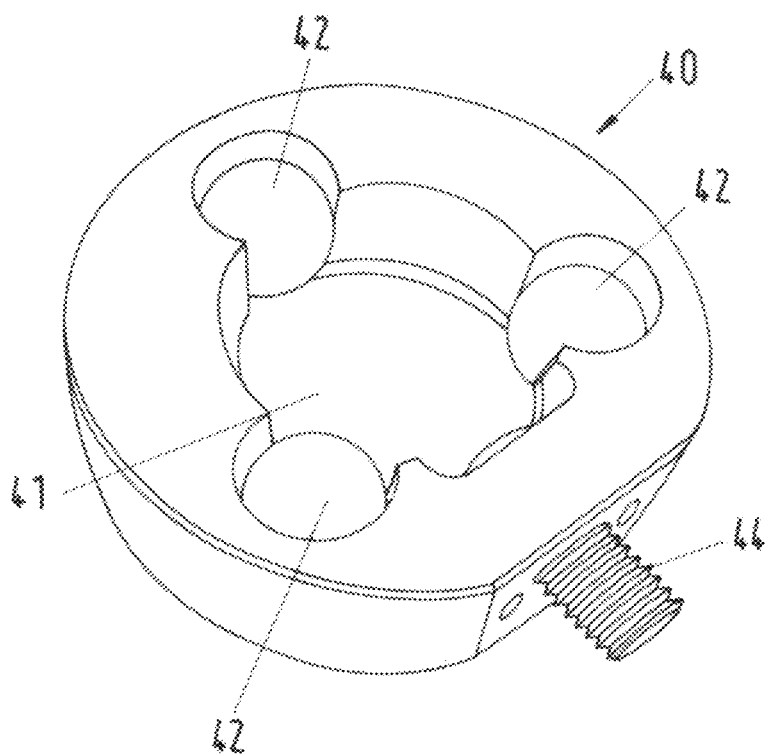
FIG. 4 shows a representation of a detail of the ring stylus from FIG. 3.

A receiving region for the stylus 20 (for example a threaded bore) cannot be seen in FIG. 4. As is evident from FIG. 3, the stylus 20 may for example be screwed into the ring stylus 40 on an outer circumferential surface thereof. It is similarly possible however to arrange the stylus 20 at a different position, such as for example directly on the shank portion 46 or else on a separately provided shank portion 46.

Figure 5:
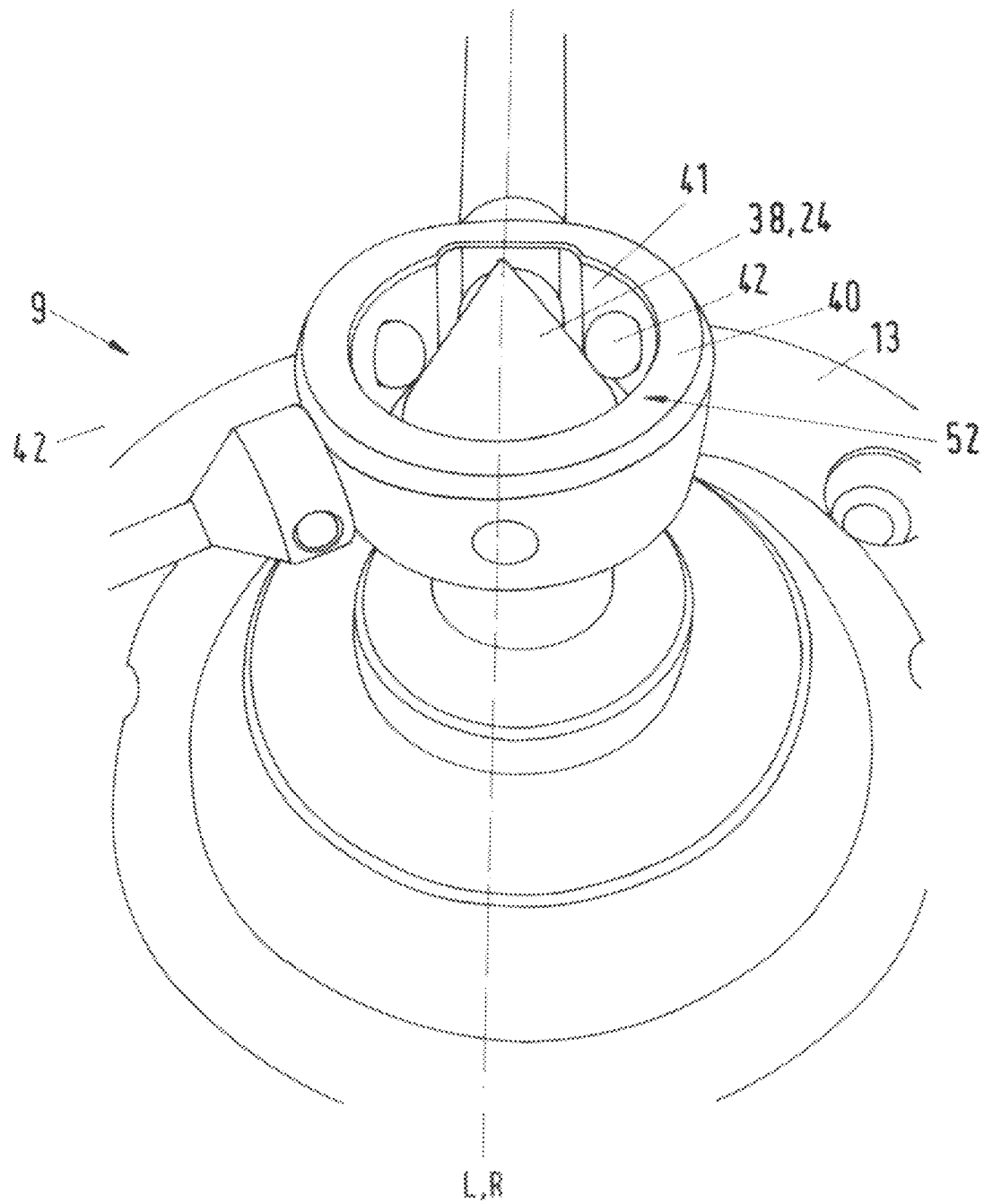
FIG. 5 shows the ring stylus from FIG. 3 in interaction with the arrangement from FIG. 2.

An operation of probing a component 34 with the ring stylus 40 of FIG. 3 and FIG. 4 is explained once again below on the basis of FIG. 5 and FIG. 6. As shown in FIG. 5, the component 24 is the lower cone tip 38 of the rotary table 13.

Figure 6:
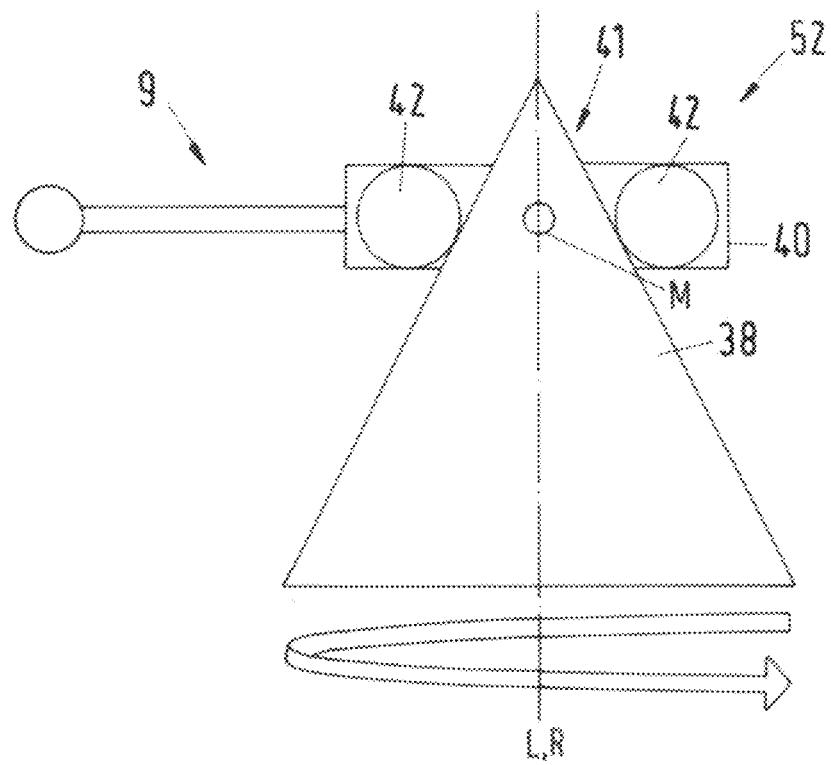
FIG. 6 shows a cross-sectional representation of the state from FIG. 5.

As shown in FIG. 6, a longitudinal axis L of this cone tip 38 coincides with the axis of rotation R of the rotary table 13, which, for example, has already been checked by another measuring process during the assembly of the rotary table 13. Even in the case of a not yet fully completed adjustment of the spatial position of the rotary table 13 or of the cone tip 38 in the working space of the CMM 11, the longitudinal axis L or the axis of rotation R is arranged substantially along the Z axis of the coordinate system from FIG. 2.

The stylus 9 attached to the CMM 11 is accordingly first advanced toward the cone tip 38 in the negative Z direction (i.e. downward), to be precise in such a way that it can be received in the opening 41 of the ring stylus 48. The displacement movement may be activated for example by manual operation. In a way known per se, the stylus 9 is in this case mounted compliantly on the CMM 11 by way of the freedoms of movement provided by the probe 5. To put it another way, the stylus a can move in relation to the CMM 11 and also the cone tip 38 along preferably all of the spatial axes (in particular by displacing and or tilting), to be precise within the freedoms of movement explained above. Even if these freedoms of movement may turn out to be comparatively small (for example may be only a few millimeters, and in particular less than about 4 millimeters), this may be adequate for at least a fine adjustment of the cone tip 38 or of the rotary table 13 according to the procedure described below.

As mentioned, the freedoms of movement may also be restored by the axes of the CMM 11 being suitably readjusted or re-displaced (for example in the direction of and/or to the extent of the positional and/or orientational change of the component 24). This may for example be performed in such a way that the distance of a sensor interface of the CMM 11 and a stylus tip (for example in the form of a probing element or a receiving portion) and/or the stylus tip in relation to the sensor interface does not go below a minimum distance. The latter could occur if the compliant mounting (for example in the measuring head) were compressed too much. The CMM 11 can therefore yield and/or give way to the positional and/or orientational change of the component 24 by axial adjustments in the same directions. The extent of the axial adjustments may be determined by a degree of compression of the compliant mounting. Information on the degree of compression and/or on the relevant directions may be obtained by a measuring head. All of the aspects of this paragraph can be claimed separately or in any combination with one another and are moreover independent of the further details of the exemplary embodiment.

If, therefore, it is approximately ensured by suitable (manual) activation that a center point of the opening 41 or of the ring stylus 40 coincides approximately with the longitudinal axis L and the axis of rotation R, when moving down in the Z direction onto the cone tip 38 at least one of the contact balls 42 will come into contact with an outer circumferential surface of the cone tip 38. As a result of the freedoms of movement provided, a self-adjustment of the ring stylus 40 in relation to the cone tip 38 then takes place as the movement is continued in the negative Z direction, for example by displacements transversely to the actual Z direction of movement of the ring stylus 40 generated by the CMM 11.

To be more precise, the self-adjustment takes place in the form that the ring stylus 40 aligns itself in a plane orthogonal to the direction of movement (i.e. In the X-Y plane), until all of the contact balls 42 are in contact with the outer circumferential surface of the cone tip 38. It is similarly possible however that the ring stylus 40 in this case pivots slightly about one of the horizontal coordinate axes X, Y or about an axis in the X-Y plane defined by them, until once again all of the contact balls 42 are in contact with the cone tip 38.

The outer surface of the cone tip, which is a free-standing projection-like portion of the component, consequently forms a centering portion 52, described at the beginning, which is received by the stylus 9.

The probe 5 can sense the counter forces that occur and are applied to the stylus 9 and can automatically discontinue the probing operation when they reach a predetermined threshold value. The threshold value is chosen in such a way that it corresponds to a state in which all of the contact balls 42 are in contact with the component to be probed (the cone tip 38). For this, suitable values can be experimentally determined in advance, in particular already before the CMM 11 is delivered by the manufacturer.

The state that is ultimately obtained, in which all of the contact balls 42 lie against the outer circumferential surface of the cone tip 38, is shown in the schematic representation from FIG. 6. What it shows is that, in this state, a geometrical center point of the opening 41 of the ring stylus 40 lies on the longitudinal axis L or axis of rotation R, wherein the longitudinal axis L runs through the geometrical center point of the cone tip 38, which is not separately represented. This state corresponds to a defined (i.e. predetermined) arrangement of the stylus 9 (and in the case shown of its ring stylus 40) in relation to the component 24 to be probed in the form of the cone tip 38. In the example shown, this defined arrangement is achieved with little expenditure by way of the aforementioned self-adjustment and also on account of the compliant mounting of the stylus 9 on the CMM 11.

Once the defined arrangement has been achieved, with known dimensions of the cone tip 38 and of the ring stylus 40, the position of the center point M of the ring stylus 40 can be deduced, and consequently for example also at least the X and Y coordinates of a center point of the cone tip 38. For this, a coordinate value determined in a way known per se by means of the probe 5 (in particular a three-dimensional coordinate value), for example with the dimensions mentioned, is calculated.

Even more accurate measurement is achieved if, after self-centering probing, the rotary table together with the cone tip 38 is rotated in relation to the preferably stationary ring stylus 40. The coordinates of the center point M can then be continuously determined, and should preferably form a uniform circle with a uniform diameter. With the coordinates determined, a computational circle fitting process may be performed, and a cone center point in the plane of the ring stylus 40 determined in relation to the axis of rotation R.

One finding of the invention is that, if the correspondingly defined arrangement of the stylus 9 and the component 24 (for example the cone tip 38) is retained, even when there are changes of a position of the component 24 to be probed in the working space of the CMM 11, a determination of coordinate values of this component 24 is continuously possible. This may be performed for example by continuously determining and converting coordinate values of the stylus 9 into coordinate values for relevant (virtual or actual) points, axes or planes of the probed component 24.

To put it another way, it is ensured by the initially set and subsequently maintained defined relative alignment, and in particular defined centering, of the stylus 9 and the component 24 to be probed in relation to one another that, by coordinate values of the stylus 9, usable information with regard to the relative arrangement of the component and the CMM 11 can be determined in real-time even when there is continuous positional adaptation or adjustment of the spatial position of the component 24. This information can then be displayed to an operator, likewise preferably in real time.

Figure 8:
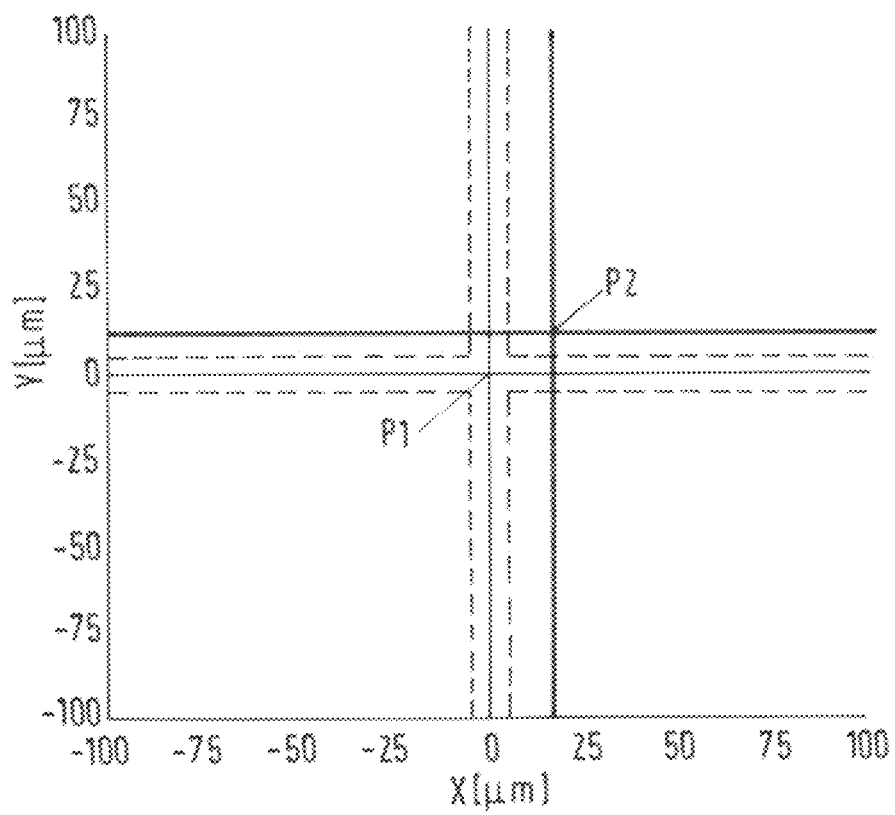
FIG. 8 shows the possible content of a display device in order to display to an operator adjustment information determined according to the invention.

Such a display by way of the determined coordinate values is shown in FIG. 8. This display may take place by means of any display devices, for example by way of a display device of the control device 12 shown in FIG. 1.

In the case represented, the rotary table 13 as such is not to be aligned in relation to the CMM 11, which however would be possible in principle by mechanical adaptation. Instead, the tip 38, or its longitudinal axis L, is to be aligned in such a way that it coincides with the axis of rotation R. This can be performed by way of setting elements (for example adjustment screws) which are not represented separately and with which the cone tip 38 can be displaced in the X-Y plane.

In this case, it is assumed by way of example that a position of the axis of rotation R in the CMM coordinate system is already known and has in particular being aligned parallel to the Z axis of the CMM 11. To put it another way, consequently an X coordinate and a Y coordinate of the axis of rotation R in the CMM system of coordinates is known. If, consequently, in the state from FIG. 6, the center point M of the cone tip 38 is arranged in the same X-Y coordinates as the axis of rotation R, it can be assumed that, given adequate production accuracy of the cone tip 38, its longitudinal axis L coincides with the axis of rotation R of the rotary table 13.

In FIG. 8, the corresponding X-Y position of the axis of rotation R is denoted by P1 and a target corridor around this position P1 is indicated by dashed lines. A current actual position of the center point M or of the longitudinal axis L in the X-Y plane is denoted by P2. This representation is already achievable whenever the ring stylus 40 has first been centered in relation to the cone tip 38 in the way described above.

Subsequently, the operator can displace the cone tip 38 in the X-Y plane, for example by actuating the aforementioned adjustment screws, so that the position P2, represented as crosshairs, is analogously displaced within the representation of FIG. 8 and in relation to the position P1.

The required information can in this case be obtained by continuously reading out the probe 5, which senses the changing position of the ring stylus 40 or of its center point M during a displacement of the cone tip 38. The operator therefore directly obtains feedback concerning the extent to which an adjustment performed by him is helpful and in particular also whether he has achieved an intended position P1 or the associated target corridor. For this, the ring stylus 40 does not have to be lifted off and a renewed probing operation does not have to be carried out after a positional change of the cone tip 38. Instead, the stylus 9 and the cone tip 38 remain in the explained defined relative arrangement in relation to one another, whereby time is saved and operating convenience is increased.

The possibility of probing a different kind of component 24, in fact of any kind, is discussed below on the basis of FIG. 7. This component has a centering portion 52, which is formed as a recess in an outer surface of the component 24. To be more precise, the component 24, represented in cross section, or the centering portion 52 thereof is formed in such a way that there are at least two surfaces 54 inclined in relation to one another. In particular, the inclined surfaces 54 may be so numerous and arranged in such a way that a (hollow) pyramid-shaped recess is obtained as the centering portion 52.

It is shown that, in a way analogous to the explanations above of FIG. 6, a self-centering probing is possible with the stylus 9. For this, the stylus 20 is used, and its probing ball 22 is moved into the centering portion 52 and brought into engagement with it. As soon as the probing ball 22 comes into contact with one of the surfaces 54, it yields within enabled the freedoms of movement of the measuring sensor 5 and gives way on account of the contact forces in opposite directions. This results in an analogous centering effect or an analogous self-centering, as explained above.

Figure 7:
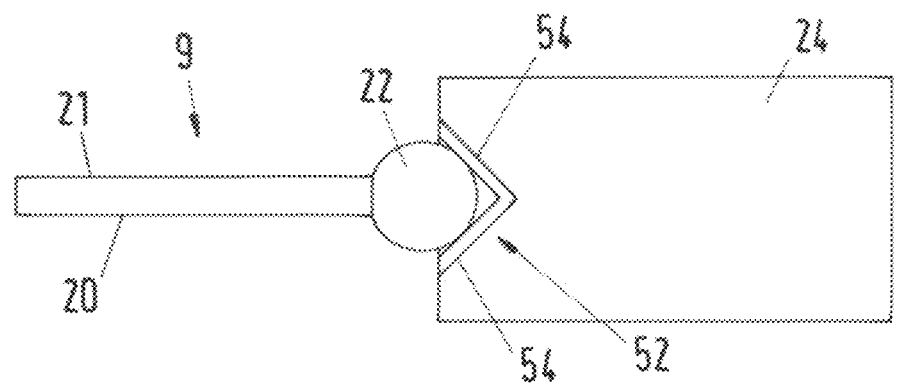
FIG. 7 shows the stylus of the stylus from FIG. 3 in interaction with a component.

The self-centered state represented in FIG. 7 is achieved when the probing ball 22 lies against all of the inclined surfaces 54. This corresponds to the defined arrangement of the stylus 9 and the component 24, while the alignment of the shank 21 is not necessarily important. To be more precise, the alignment of the shank 21 may possibly change when there are displacements of the component 24, without the state of engagement of the probing ball 22 and the centering portion 52 changing. Consequently, even when there is such a changed alignment of the shank 21, it is still possible to speak of the same defined (relative) arrangement of the stylus 9 and the component 24, since the self-centered state of engagement is retained.

Also in this case, coordinates of regions, axes, points or surfaces of the component 24 can be deduced from coordinates of the probing ball 22, since this conversion is possible with adequate accuracy because of the set defined relative arrangement. This can once again also be carried out, and in particular continuously, whenever a position of the component 24 in relation to the CMM 11 is changed. Coordinate values thereby changing can be displayed to an operator in a way analogous to the representation of FIG. 8.

A method according to the invention for arranging, and in particular positionally adjusting, various components of a workpiece holder arrangement 39 analogous to those from FIG. 2 in relation to a CMM 11 is explained below on the basis of FIGS. 9-12 and with reference to the flow diagram from FIG. 13. The CMM 11 is likewise formed in a way analogous to that from FIG. 2. In this case, only selected component parts of the workpiece holder arrangement 39 and CMM 11 are shown, but they can interact in the way explained on the basis of FIG. 2.

First, in a step S1 (as also in the case of all of the steps mentioned below, see the flow diagram from FIG. 13), the spatial position of the axis of rotation R of the rotary table 13 is determined in CMM coordinates. This is done by relying on conventional solutions, in which for example a calibrating ball is positioned on the rotary table and is rotated by it. The coordinates of the calibrating ball are then determined for example in at least 3, but preferably at least 6, rotational positions. On the basis of these coordinates, a circle can be fitted and its plane determined. On this basis, a center point of the circle through which the axis of rotation R runs orthogonally in relation to the plane of the circle can be determined. In this way, the alignment and also the X-Y position of the axis of rotation R in relation to or in the plane of the rotary table 13 is known.

In a step S2, the lower cone tip 38 of the rotary table 13 is subsequently aligned in relation to the determined center point (i.e. center) of the rotary table 13. To be more precise, the center points (or the longitudinal axis L of the cone that runs through the center point) of the cone tip 37 and the rotary table 13 are to be aligned in such a way that they lie along a common axis or, in other words, the longitudinal axis L of the cone and the axis of rotation R coincide, as shown in FIG. 6.

For this, the cone tip 37 is first coarsely positioned on the rotary table and the ring stylus 40 is pushed onto the cone tip 37 in a way analogous to the state from FIG. 6. This already produces a center-point coordinate M (see FIG. 6), which makes possible the alignment of the cone tip 37 in relation to the rotary table 13, the coordinates, and in particular center-point coordinates, of which have already been determined above by means of the calibrating ball. Preferably, however, the cone tip 37 is rotated by means of the rotary table 13, to be precise rotated by at least 360°. During this, the ring stylus 40 remains on the cone tip 37 or retains the self-centered alignment in relation thereto. A circle is determined from the center-point coordinates M of the ring stylus 40 continuously determined during the rotation.

When the target state from FIG. 6 is reached, this circle is as uniform as possible and has a diameter that is as small as possible. If, on the other hand, there is an undesirably high eccentricity (i.e. radial distance) of the longitudinal axis L of the cone in relation to the axis of rotation R, a non-uniform circle and/or a circle with a comparatively large diameter is obtained. Such measurement information or circles can be displayed to an operator. Similarly, it can be determined from this to what extent and in what direction a displacement of the cone tip 37 in relation to the rotary table 13 in the X-Y plane is appropriate, and this can be displayed to him in a way analogous to FIG. 8.

On the basis of the relative relationship considered of the cone center point to the rotary table axis of rotation R, skewed positions of the stylus 9 in the X-Y plane do not have any falsifying influence. These skewed positions may also be referred to as mechanical angular errors and occur in spite of self-centering probing, for example on account of production tolerances or inadequate adjustment when attaching the stylus 9. On account of the procedure according to the invention, these are however negligible in the present case.

On the basis of FIG. 9 and step S3, in the following the position of the upper cone tip 37 is adjusted, or generally the counterholder arrangement 32, and in particular its adjustment axis 35. Reference is made here to the previously determined rotary table position (or centerpoint position) and alignment of its axis of rotation R.

Figure 9:
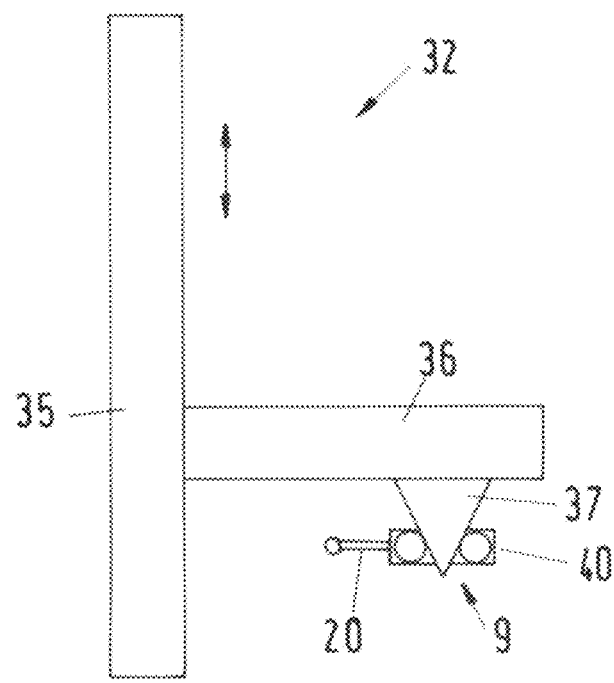
FIG. 9 is a schematic representation of a counterholder arrangement.

In the schematic representation of FIG. 9, there can first be seen the displacement axis 35 of the counterholder arrangement 32, the movement of which is indicated by a double-headed arrow. There can also be seen the arm 36, which is attached thereto, is displaceable along the displacement axis 35 and at the free end of which the (counterholder) cone tip 37 is positioned.

First, the cone tip is measured with the ring stylus 40 (i.e. the cone tip 37 is received in the ring stylus 40 in a self-centering manner) when the arm 36 is in a lowermost position along the displacement axis 35 (i.e. in a lowermost Z position Z1). In this state, the center-point coordinates of the cone tip 37 are determined in a way analogous to the example from FIG. 6.

Figure 10A:
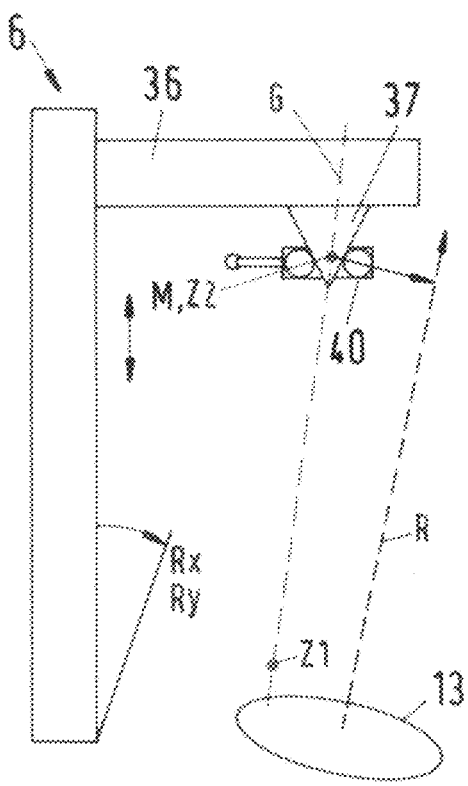
FIG. 10a is a schematic representation of an arm displaced into an uppermost position.

Subsequently, in step S4, the arm 36 is moved along the displacement axis 35 into the uppermost position Z2, as shown in FIG. 10a. There, a center-point coordinate determination takes place once more by means of the ring stylus 40. On the basis of the center-point coordinates determined altogether in the two positions Z1, Z2 of the arm 36 from FIG. 9 and FIG. 10a, an orientation of the so-called counterholder axis G in space can be determined. Given adequate production tolerances, the counterholder axis G can be assumed to be parallel to the displacement axis 35 (not correspondingly represented in FIG. 10a on account of the schematic simplification).

Represented by way of example in FIG. 10a are the Z coordinates Z1 and Z2 in the various positions of the arm 36. The aim is to align the counterholder axis G parallel to the axis of rotation R of the rotary table 13. As mentioned, this alignment of the axis of rotation R was already determined at the beginning of the method. Consequently, as indicated by the arrow in FIG. 10a, required rotations $R_x$ and $R_y$ about the X and Y axes of the counterholder arrangement 32 can be determined, in order that the counterholder axis G is parallel to the axis of rotation R (see the state in FIG. 10c). From these required rotations $R_x$, $R_y$, it is possible to calculate correction offsets, for example along the linear axes X, Y, Z, which can be implemented from the center point M in the upper position Z2 in order to realize the corresponding rotations $R_x$, $R_y$. These can then be displayed to an operator for each one or only for selected ones of these axial directions X, Y, Z (see FIG. 10b; at P2, the actual position and P1 the intended position of the center point M is in the upper position Z2 in the X-Y plane). With the described conversion, account is advantageously taken of the true rotational point of the displacement axis 35, which is at a distance from the lower position Z1 by a fixed amount (offset) in Z, wherein this value can be obtained by the measurement in the lower position Z1.

Figure 10C:
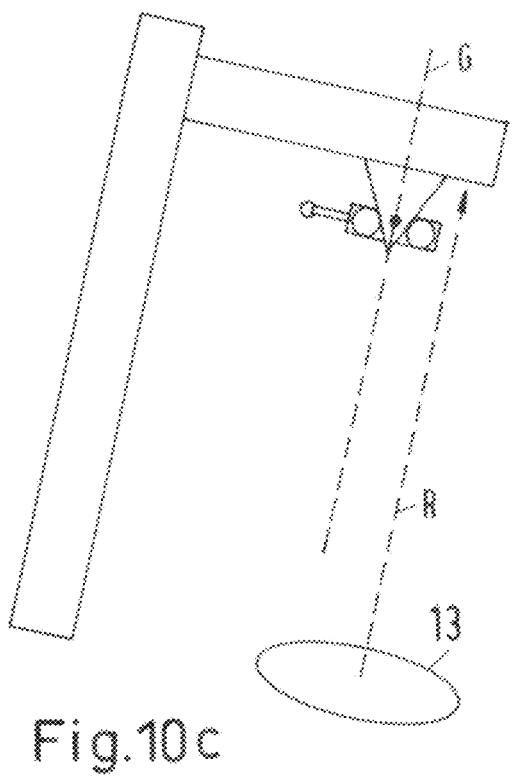
FIG. 10c is a schematic representation of an arm displaced to align a counterholder axis parallel to an axis of rotation of a rotary table.
Figure 10B:
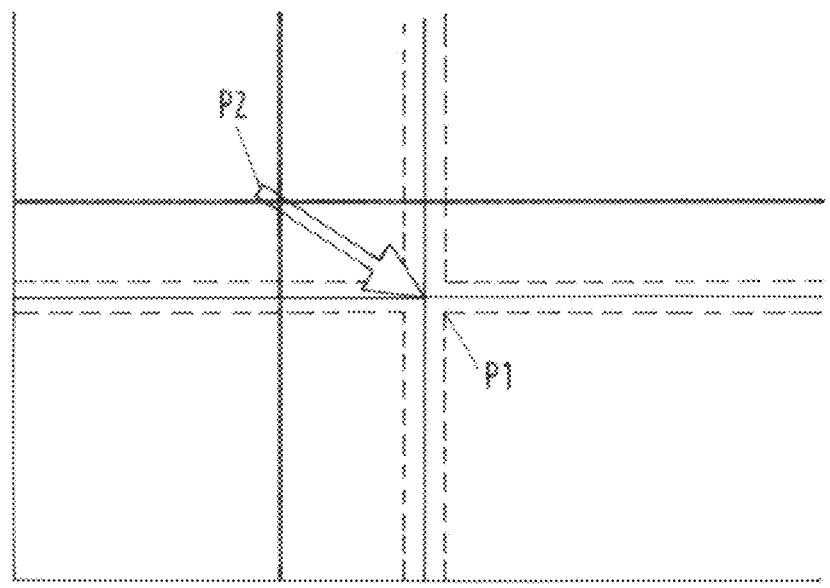
FIG. 10b is a graphical representation of actual position and intended position in an X-Y plane.

It can be seen from a comparison of FIGS. 10a and 10c that an angle of intersection (or the smallest angle of intersection) in FIG. 10a between the plane of the receiving portion 43 and the axis of rotation R increases when the transition is made to FIG. 10c.

In a then-following step S5, the absolute positioning of the counterholder arrangement 32 and for example of its displacement axis 35 in the X-Y plane is then suitably adapted, while retaining the previously set inclination. Also in this case, the ring stylus 40 remains in the defined relative arrangement in relation to the cone tip 37, so that it can be arranged centrally in relation to the axis of rotation R of the rotary table 13. As a result, ultimately the state from FIG. 6 is achieved. On account of the knowledge of the alignment of the axis of rotation R and the center-point coordinate of the cone tip 37, current deviations from this state can be displayed to an operator in a way analogous to FIG. 8.

Figure 12:
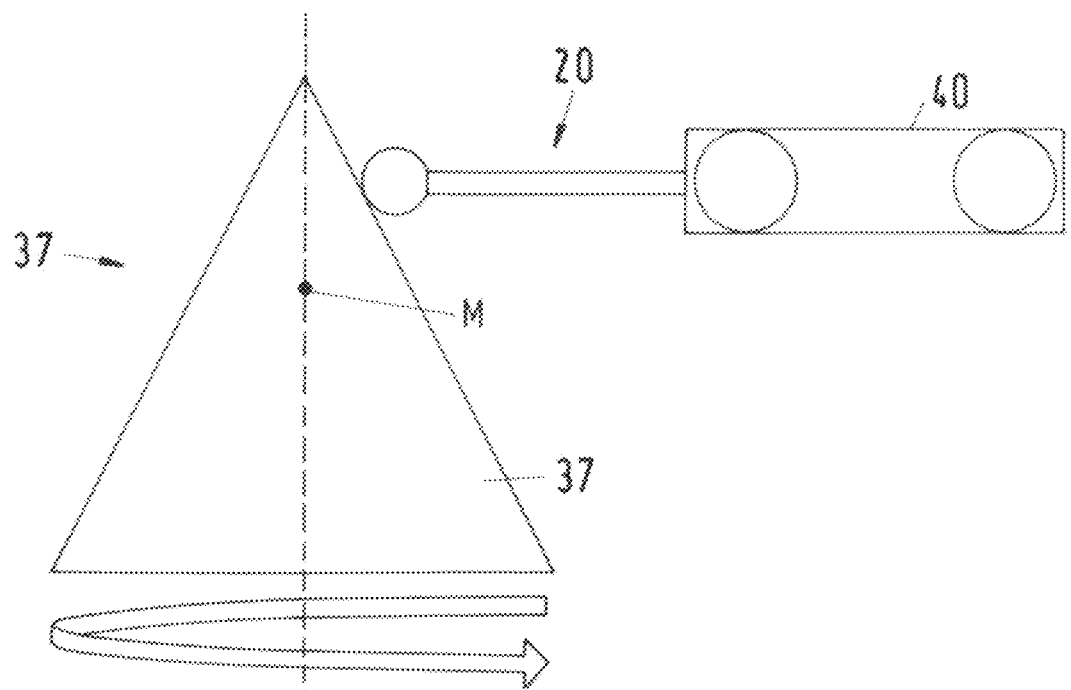
FIG. 12 is a schematic representation of measurement of an upper cone tip by a coordinate measuring machine.
Figure 13:
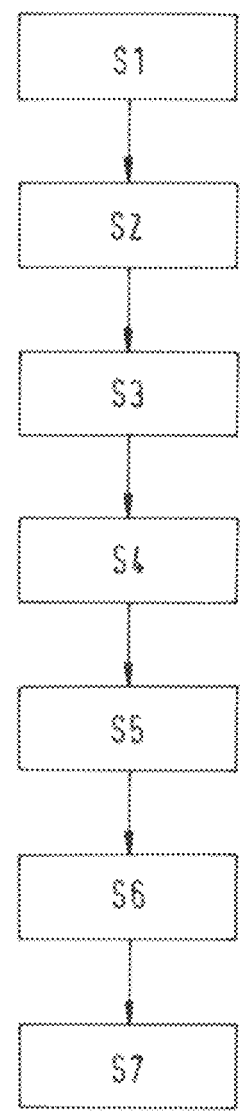
FIG. 13 shows a flow diagram for the method explained on the basis of FIGS. 9-12.

Even more accurate, however, is a variant of step S5 in which the stylus 20 is used for the positional determination in the X and Y planes, as represented in FIG. 12. The reason is that, with an inclined counterholder arrangement 32 or cone tip 37, the ring stylus 40 may be skewed in relation to the X-Y plane. For example, it may be tilted in the course of the adjustment of the inclination together with the cone tip 37 in relation to this plane. This skewed position may bring about an undesired, since inexact, offset of an X-Y position determined with the ring stylus 40. In particular, the mechanical angular errors discussed above, which cause a corresponding skewed position, may occur. Since in step S5, however, the absolute cone position (or center-point position) in space and not just the relative position in relation to the axis of rotation R is to be determined, these angular errors are only acceptable if corresponding sacrifices in accuracy are made. In order to improve the accuracy, therefore, in the case of FIG. 12, probing is performed with the stylus 20 and not with the ring stylus 40, to be precise preferably for both cone tips 37, 38, in order to determine precisely the X-Y position of their center points M and a resultant X-Y offset (see below).

As shown in FIG. 12, the stylus 20 styli the outer circumferential surface of the counterholder cone tip 37, which in FIG. 12 is shown in inverted orientation. Subsequently, the stylus 20 is moved by at least 180° in relation to or along the outer circumferential surface of the cone tip 37 (for example by means of the corresponding CMM axes). This can then be used to determine the coordinates of a circle center point M, which in turn lies on the longitudinal axis L of the cone.

Figure 11:
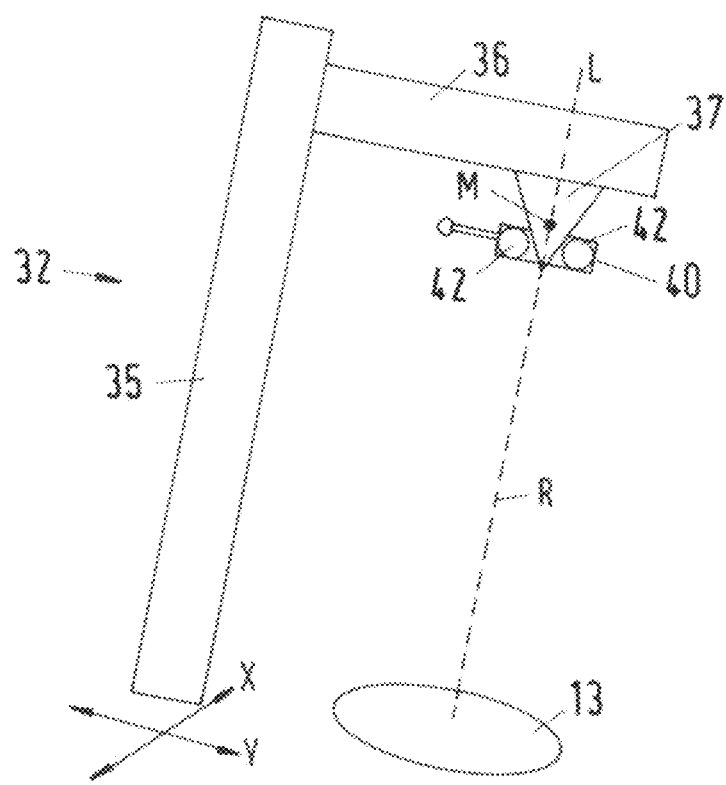
FIG. 11 is a schematic representation of an intended position of a cone center point at an upper position of an arm.

An intended position of the cone center point M at the upper position of the arm 36 (as shown in FIG. 11), in which this point lies directly opposite the lower cone tip 38 along the axis of rotation R, can be determined by the initially determined rotary-table center point and the alignment of the axis of rotation R, which were determined in the previous method steps. This takes place in step S6. In detail, for this the measurement of the upper cone tip 37 is carried out with the stylus 20 and its displacement by means of the CMM 11 in a way corresponding to the variant from FIG. 12, and the absolute coordinates of the circle center point M are thereby determined. The positional error of the counterholder arrangement 32 or of the upper cone tip 37 in the X-Y plane is calculated from the offset of the circle center points M of the upper and lower cone tips 37, 38, while taking into account the axis of rotation R. To be more precise, from the center-point coordinates of the lower cone tip 38 and with knowledge of the alignment of the axis of rotation R, the intended center-point coordinates of the upper cone tip 37 can be determined (for example at the height Z2). The difference from the actual position of the upper cone tip 37 then forms the positional error to be corrected. In order to correct this positional error, which corresponds to a relative offset of the cone tips 37, 38 in the X-Y plane, preferably again a self-centering probing of the upper cone tip 37 is performed with the ring stylus 40, so that a correction in the way described above can be monitored and displayed in real time.

This intended coordinate is then compared in step S7 with the cone-tip center-point coordinate determined according to FIG. 12 and displayed to an operator as in FIG. 8. The operator therefore once again obtains real-time feedback with regard to the current spatial position (or at least of the center point position of the upper cone tip 37 in the X-Y plane) and the intended position in this respect.

Finally, an exact positional alignment of the counterholder arrangement 32 in the working space of the CMM 11 can in this way be achieved, and in particular in relation to the rotary table 13. Advantages of the present invention, for example on account of the maintained defined arrangement of the stylus and the measured component (for example the cone tip 37, 38), come into effect in particular in the state of FIG. 10a and also in the centering of the lower cone tip 38 in relation to the rotary table 13.

It goes without saying, however, that the present invention also has advantages independently of the procedure described here with respect to the counterholder arrangement 32, and also entirely different kinds of components 24 can hereby be measured and positionally adjusted, as explained for example in connection with FIG. 7.

The phrase at least one of A, B, and C should be construed to mean a logical (A OR B OR C), using a non-exclusive logical OR, and should not be construed to mean "at least one of A, at least one of B, and at least one of C."

What is claimed is:

1. A method for aligning a component in relation to a coordinate measuring machine having a stylus, the method comprising:
   while the component is at a first position relative to the coordinate measuring machine, positioning the stylus at a second position such that the second position has a first positional relationship with the first position;
   determining a conversion rule for calculating a coordinate of the component;
   acquiring a coordinate of the component based on the conversion rule; and in response to the component being repositioned to a third position relative to the coordinate measuring machine, repositioning the stylus to a fourth position such that (i) the fourth position has a second positional relationship relative to the third position that is substantially the same as the first positional relationship and (ii) the conversion rule remains valid for the second positional relationship.

2. The method of claim 1, further comprising at least one of:
calculating coordinates of the component using the conversion rule while the component is repositioned to the third position and
calculating coordinates of the component using the conversion rule after the component is repositioned to the third position.

3. The method of claim 1, wherein the stylus is mounted compliantly on a probe of the coordinate measuring machine.

4. The method of claim 3, wherein axes of the coordinate measuring machine are stationary while the component is repositioned from the first position to the third position.

5. The method of claim 3, wherein axes of the coordinate measuring machine are moved in accordance with the repositioning of the component from the first position to the third position.

6. The method of claim 1, wherein:
the component comprises a centering region and
the second positional relationship is obtained by bringing the stylus and the component into engagement in the centering region.

7. The method of claim 6, wherein a recess of the component forms the centering region.

8. The method of claim 1, wherein:
the stylus has a receiving portion and
the receiving portion is configured to receive at least a portion of the component when the component is at the third position and the stylus is at the fourth position.

9. The method of claim 8, wherein:
the coordinate measuring machine comprises an axis;
the component is aligned to have a first angle between the receiving portion and the axis when the component is at the first position;
the component is aligned to have a second angle between the receiving portion and the axis when the component is at the third position; and
the second angle is different from the first angle.

10. The method of claim 9, wherein the axis is an axis of rotation of a rotary table.

11. The method of claim 1, wherein:
the stylus has a shank on which a probing element is arranged and
the probing element is in contact with the component when the component is at the first position and the stylus is at the second position.

12. The method of claim 1, wherein:
the component is a component part of a counterholder arrangement;
the counterholder arrangement includes a counterholder that is displaceable along a displacement axis of the counterholder arrangement; and
repositioning the component to the third position includes aligning the displacement axis in parallel with an axis of the coordinate measuring machine.

13. The method of claim 1, wherein:
the component is a component part of a counterholder arrangement;
the counterholder arrangement includes a counterholder that is displaceable along a displacement axis of the counterholder arrangement; and
repositioning the component to the third position includes making a position of the component in a plane running non-parallel to the displacement axis coincide with an intended position in the plane.

14. The method of claim 1, wherein:
the stylus comprises a centering region; and
the second positional relationship is obtained by bringing the component into engagement with the centering region.

15. The method of claim 1, wherein:
the first position of the component comprises a first location of the component in space;
the second position of the stylus comprises a second location of the component in space;
the third position of the component comprises a third location of the component in space; and
the fourth position of the stylus comprises a fourth location of the component in space.

16. The method of claim 15, wherein:
the first position of the component comprises a first orientation of the component in space;
the second position of the stylus comprises a second orientation of the component in space;
the third position of the component comprises a third orientation of the component in space; and
the fourth position of the stylus comprises a fourth orientation of the component in space.

17. A system comprising:
a coordinate measuring machine and
a stylus coupled to the coordinate measuring machine, wherein:
a component and the stylus have a first positional relationship when the component is at a first location relative to the coordinate measuring machine and the stylus is at a second location,
the system is configured to:
move the component from the first location to a third location relative to the coordinate measuring machine and
move the stylus from the second location to a fourth location,
the third location has a second positional relationship with the fourth location,
the second positional relationship is substantially the same as the first positional relationship,
the system is configured to determine a conversion rule for calculating coordinates of the component, and
the conversion rule is valid for the second positional relationship.

* * * * *